(12) United States Patent
Amanuma et al.

(10) Patent No.: US 9,275,256 B2
(45) Date of Patent: Mar. 1, 2016

(54) SEMICONDUCTOR INTEGRATED CIRCUIT

(71) Applicant: Renesas Electronics Corporation, Kawasaki-shi (JP)

(72) Inventors: Yoshiyuki Amanuma, Kawasaki (JP); Takanori Miyoshi, Kawasaki (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 0 days.

(21) Appl. No.: 14/556,160

(22) Filed: Nov. 30, 2014

(65) Prior Publication Data

US 2015/0089676 A1    Mar. 26, 2015

Related U.S. Application Data

(63) Continuation of application No. 14/019,343, filed on Sep. 5, 2013, now Pat. No. 8,912,815.

(30) Foreign Application Priority Data

Sep. 20, 2012  (JP) .................................. 2012-206965

(51) Int. Cl.
*H03K 19/00*  (2006.01)
*G06F 21/81*  (2013.01)
*H03K 19/003*  (2006.01)
*G06F 11/10*  (2006.01)
(Continued)

(52) U.S. Cl.
CPC ................ *G06F 21/81* (2013.01); *G06F 11/10* (2013.01); *G06F 21/64* (2013.01); *G06F 21/75* (2013.01); *H03K 19/003* (2013.01)

(58) Field of Classification Search
CPC ............... H03K 19/17768; G06F 21/74–21/76

USPC ............................................................ 326/8
See application file for complete search history.

(56) References Cited

U.S. PATENT DOCUMENTS 6,458,547 B1 * 10/2002 Bryan et al. ........................ 506/9
7,042,752 B2    5/2006 Okuda
8,604,521 B2 * 12/2013 Wu ............................... 257/225
(Continued)

FOREIGN PATENT DOCUMENTS

JP    2008-198700 A    8/2008
JP    2009-187438 A    8/2009
(Continued)

OTHER PUBLICATIONS

United States Notice of Allowance dated Aug. 8, 2014, (U.S. Appl. No. 14/019,343).

*Primary Examiner* — Jason M Crawford
(74) *Attorney, Agent, or Firm* — McGinn IP Law Group, PLLC

(57) ABSTRACT

A method of a semiconductor integrated circuit comprising a logic circuit including n storage elements (n is a positive integer) which can each store 1-bit information and an attack detection circuit, the method including detecting, by an error determination circuit, through a logic operation that k-bit or less errors (k is a positive integer) have occurred in n-bit codes stored in the n storage elements, and detecting, by a light irradiation detection circuit which includes light detection elements, that light has been irradiated to (k+1) or more of the n storage elements. It is determined that the logic circuit has been attacked from outside when the error determination circuit detects an error or the light irradiation detection circuit detects light irradiation.

20 Claims, 14 Drawing Sheets

(51) Int. Cl.
*G06F 21/75* (2013.01)
*G06F 21/64* (2013.01)

(56) References Cited

U.S. PATENT DOCUMENTS

2003/0218475 A1* 11/2003 Gammel .......................... 326/8
2004/0120195 A1* 6/2004 Okuda ......................... 365/200

2011/0193616 A1 8/2011 Amanuma et al.
2013/0076430 A1 3/2013 Amanuma et al.

FOREIGN PATENT DOCUMENTS

| | | |
|---|---|---|
| JP | 2009-289104 A | 12/2009 |
| JP | 2010-161405 A | 7/2010 |
| JP | 2011-165732 A | 8/2011 |

* cited by examiner

FIG. 7
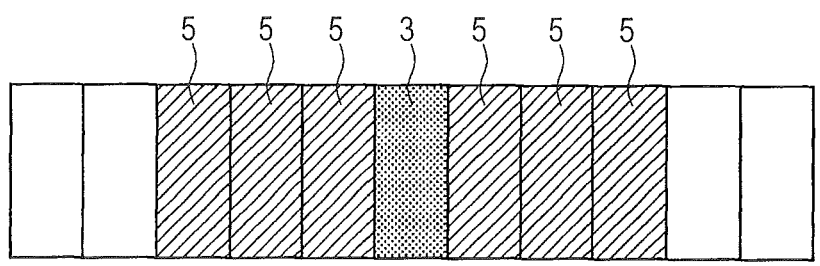
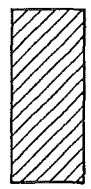 : FLIP-FLOP  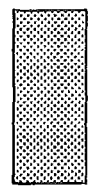 : LIGHT DETECTION ELEMENT   : LOGIC GATE OR THE LIKE FIG. 10
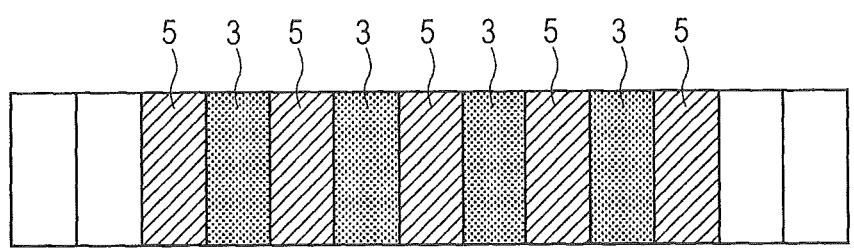
 : FLIP-FLOP   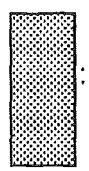 : LIGHT DETECTION ELEMENT    : LOGIC GATE OR THE LIKE

SEMICONDUCTOR INTEGRATED CIRCUIT

CROSS-REFERENCE TO RELATED APPLICATIONS

The present application is a Continuation application of U.S. patent application Ser. No. 14/019,343, filed on Sep. 5, 2013, which is based on Japanese Patent Application No. 2012-206965 filed on Sep. 20, 2012, the entire contents of which are hereby incorporated by reference.

BACKGROUND

The present invention relates to a semiconductor integrated circuit, and in particular, is suitably applicable to measures against a fault attack for the purpose of fraudulent acquisition or falsification of confidential information.

There is a fault attack utilizing a malfunction of a security microcontroller for the purpose of acquisition or falsification of confidential information stored in e.g. the microcontroller for handling the confidential information. The malfunction is caused by the application of an abnormal voltage or an abnormal frequency clock, a laser irradiation attack, etc. The laser irradiation attack can cause a fault at a local region, which is an extreme threat among fault attacks; accordingly, there has recently been increasing importance of measures against the laser attack.

There are adopted the placement of a light detector, circuit duplexing, data error detection utilizing an error detection code (e.g., parity), and the like as measures against the laser attack. As for the placement of the light detector, a light detection element is disposed in a semiconductor chip where the microcontroller for handling confidential information is formed, thus directly detecting laser irradiation. As for the circuit duplexing, in a simple example, two storage elements such as flip-flops are provided, and the same data is inputted to the two storage elements. When the data is read out, the two outputs are compared. If the outputs do not match, it is determined that a fault attack has been made. There are a variety of duplexing units ranging from the above simple example to an example of duplexing an entire CPU (Central Processing Unit). As for the error detection, an error detection code such as parity is calculated beforehand based on data to be stored. When the stored data is read again, an error correction code is calculated again and compared with the stored code. If the codes do not match, it is determined that a fault attack has been made.

Japanese Unexamined Patent Publication No. 2010-161405 (Patent Document 1) discloses light detectors based on SRAM (Static Random Access Memory) memory cells comprised of six transistors (FIG. 1) and shows an embodiment of dispersedly disposing light detectors in the memory mat of SRAM (FIG. 4 etc.). Further, Patent Document 1 discloses an embodiment (FIG. 13, paragraphs 0089 to 0094) of disposing light detectors in a cell array configuring a logic circuit such as CPU and a D-type flip-flop (FIG. 15, paragraphs 0096 to 0097) incorporating a light detection circuit.

Japanese Unexamined Patent Publication No. 2011-165732 (Patent Document 2) discloses a light detection circuit based on a CMOS (Complementary Metal-Oxide-Semiconductor) inverter. A light receiving unit is provided on the inverter, where a malfunction is caused by light irradiation and detected.

Japanese Unexamined Patent Publication No. 2008-198700 (Patent Document 3) discloses a light detector of thyristor structure. The light detector is configured by forming a PNPN junction by a P well, an N well, and impurity diffused layers formed in the respective wells, and can be formed in a small area 10 μm square for example (FIG. 3, paragraph 0029).

Japanese Unexamined Patent Publication No. 2009-289104 (Patent Document 4) discloses a security device which compares responses obtained from the processing of the same command in duplexed cores including memories and CPUs, determines that it is under fault attack if the results do not match, and executes error processing.

Japanese Unexamined Patent Publication No. 2009-187438 (Patent Document 5) discloses a technique for protecting a program by an error detection code in an IC card including a CPU for executing a program stored in a non-volatile memory. For each instruction code, EDC (Error Detecting Code) is calculated, added, and stored beforehand in the non-volatile memory. At the time of readout by the CPU for execution, EDC is calculated again and compared with the stored EDC. If the EDCs do not match, it is determined that a fault attack is being made.

SUMMARY

Although the placement of light detectors as measures against the laser attack is effective in terms of directly detecting light irradiation, it is essential to dispose a light detection element at a light irradiation position. Recently, there has appeared an attack method for irradiating laser light, avoiding disposed light elements, with a laser beam diameter reduced to several μm, so that there has occurred a problem that the light detector cannot detect it.

While FIGS. 1 and 9 in Patent Document 3 disclose an example for disposing light detectors closely in a light detection range under the assumption that a laser light diameter is reduced to several hundred μm (paragraph 0011), it is not applicable to the light diameter reduced to several μm. This is because although it is necessary to dispose light detection elements at intervals of several μm which is the assumed laser light diameter, light detection elements disclosed in FIG. 3 in Patent Document 3 produce 10 μm square, and occupy too large area if they are disposed at intervals of several μm, which is unrealistic in terms of cost. The light detection elements disclosed in Patent Documents 1 and 2 are as small as the size of the SRAM memory cell or a logic gate, and therefore can be disposed at intervals of several μm, but occupy too large area, which impacts the chip cost. Further, if the laser beam diameter becomes as small as the size of the SRAM memory cell and the logic gate in the future, these become unrealistic in terms of cost.

Although the circuit duplexing as measures against the laser attack is effective in terms of being resistant to any fault attack including the laser attack, it is necessary to double the circuit size, which impacts the chip cost. For example, the duplexing described in Patent Document 4 requires two sets of memories and CPUs which execute the same processing, which makes an extremely large impact on the chip cost.

Although the error detection as measures against the laser attack is effective in terms of unnecessity of doubling the circuit size, the error detection code itself has a theoretical detection limit. For example, in parity check and check sum, parity is generated so that the total number of is having 1-bit parity added becomes either even or odd which is determined beforehand. For example, in the case of even parity, a read result indicating that data has changed to odd parity enables a fault determination. However, if 2 bits have changed simultaneously, data of even parity remains even parity, so that the errors cannot be detected. The same applies to the check sum. Therefore, the parity check and the check sum can detect a 1-bit error, but cannot detect or falsely detect 2-bit or more errors. An increase in the number of redundant bits enables the detection of multiple-bit errors, which however increases the size of an error detection circuit. Therefore, this functions effectively in the case of a sufficiently small laser beam diameter and occurrence of an error of the number of bits within the theoretical detection limit of the error detection code itself, but does not always detect errors in the case of a large beam diameter and occurrence of errors of the number of bits beyond the detection limit.

Thus, among various kinds of methods as measures against the laser attack, there is no method that can cope with every laser beam diameter within the range of realistic chip cost.

While means for solving these problems will be described below, the other problems and novel features will become apparent from the description of this specification and the accompanying drawings.

One embodiment will be described below.

An attack detection circuit for checking multi-bit storage elements included in a logic circuit is provided. The attack detection circuit includes an error determination circuit capable of detection through a logic operation such as a code theory and a light irradiation detection circuit having light detection elements, and the light detection elements are arranged so that the light irradiation detection circuit can detect errors of the number of bits beyond the detection limit of the error determination circuit. Due to error detection by the error determination circuit and light irradiation detection by the light irradiation detection circuit, the circuits complementarily detect attacks from outside.

An effect obtained by the above-described embodiment will be briefly described as follows.

It is possible to detect a laser attack, irrespective of the number of error bits in multi-bit storage elements caused by the laser attack on the logic circuit.

BRIEF DESCRIPTION OF THE DRAWINGS

FIG. 7 is an explanatory diagram showing the arrangement of flip-flops and light detection elements for detecting light irradiation to four or more storage elements (flip-flops).

FIG. 10 is an explanatory diagram showing a case where flip-flops and light detection elements are alternately adjacently disposed to detect light irradiation to two or more storage elements (flip-flops).

DETAILED DESCRIPTION

1. Outline of Embodiments

Figure 1:
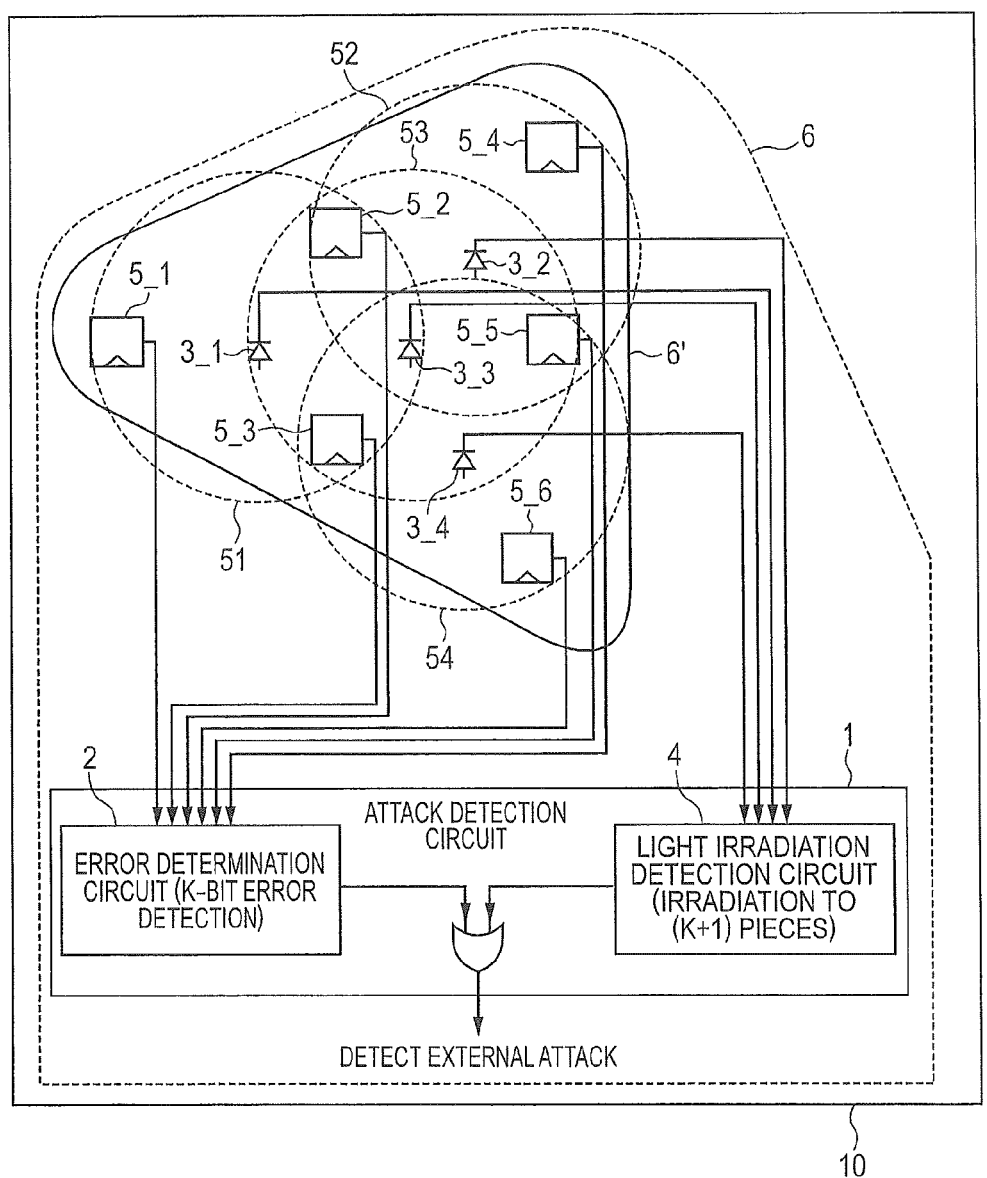
FIG. 1 is an explanatory diagram showing a configuration example of a semiconductor device according to a first embodiment.

First, exemplary embodiments of the invention disclosed in the present application will be outlined. Reference numerals in the drawings that refer to with parentheses applied thereto in the outline description of the exemplary embodiments are merely illustration of ones contained in the concepts of components marked with the reference numerals.

[1]<Error Determination Circuit+Light Irradiation Detection Circuit>

A semiconductor integrated circuit (10) including a logic circuit (6) including n storage elements ($5\_1$ to $5\_6$) (n is a positive integer) which can each store 1-bit information and an attack detection circuit (1) is configured as follows.

The attack detection circuit includes an error determination circuit (2) and a light irradiation detection circuit (4). It is determined that the logic circuit has been attacked from outside when the error determination circuit detects an error or the light irradiation detection circuit detects light irradiation.

The error determination circuit can detect through a logic operation that k-bit or less errors (k is a positive integer) have occurred in n-bit codes stored in the n storage elements.

The light irradiation detection circuit has light detection elements (31 to 34) and can detect that light has been irradiated to (k+1) or more of the n storage elements.

This makes it possible to detect a laser attack, irrespective of the number of error bits in multi-bit storage elements caused by the laser attack on the logic circuit.

[2]<Error Determination Circuit=Error Detection Code Generation Circuit+Check Circuit>

In item 1, the n storage elements ($5\_7$ to $5\_11$, $5\_12$ to $5\_16$, $5\_17$ to $5\_23$) include m storage elements ($5\_11$, $5\_16$, $5\_23$) which can store m-bit error detection codes. The error determination circuit includes an error detection code generation circuit (7) for generating an error detection code from (n-m) storage elements of the n storage elements and a check circuit (8) which can detect occurrence of an error in the n storage elements.

This makes it possible to protect against a laser attack on the storage elements for storing n-bit information including the generated m-bit error detection codes for the protected (n-m) bits.

[3]<Protection by Parity Check>

In item 2, the n storage elements include one storage element (5_16) which can store a 1-bit parity code and the light irradiation detection circuit has (n−1) light detection elements (3_8 to 3_11).

The error determination circuit includes a parity code generation circuit (7) for generating the parity code from (n−1) storage elements (5_12 to 5_15) of the n storage elements and a parity check circuit (8) which can detect occurrence of an error in the n storage elements (5_12 to 5_16).

The light irradiation detection circuit detects that light has been irradiated to two or more of the n storage elements at the time of detecting that light has been irradiated to at least one of the (n−1) light detection elements.

This makes it possible to protect against a laser attack on the protected circuits including the parity check circuit for checking the storage elements for storing n-bit information including the generated parity code for the protected (n−1) bits. The parity code generation circuit and the parity check circuit can be configured with simple logic gates, which can suppress the overhead of circuits for protection.

[4]<Protection by Duplexing>

In item 1, the n storage elements include m active storage elements (5_24) which are outputs of an active logic circuit and m backup storage elements (5_24) which are outputs of a backup logic circuit duplexed with the active circuit. The error determination circuit detects that an error has occurred if an output of an active storage element does not match an output of a corresponding backup storage element. In the active storage elements and the corresponding backup storage elements, corresponding two storage elements are disposed with at least one light detection element interposed therebetween.

This makes it possible to protect against a laser attack that causes errors simultaneously in the active system and the corresponding backup system in the circuit adopting duplexing protection.

[5]<Arrangement of Light Detection Element for 1-bit Error Detection>

In item 3, arbitrary two storage elements selected from the n storage elements are necessarily disposed with at least one light detection element interposed therebetween.

This makes it possible to detect simultaneous light irradiation to two or more of the n storage elements.

[6] Macro Cell

In item 5, the (n−1) light detection elements and the n storage elements are each alternately adjacently disposed in a single cell row.

This makes it possible to design the layout of the LSI without particularly considering the arrangement of cells in automatic layout by preparing and using macro cells that satisfy the condition for detecting simultaneous light irradiation to two or more of the n storage elements.

[7]<Protection of Program Counter in CPU>

In item 1, the logic circuit is a processor (20), and the n storage elements include a program counter (24) of the processor.

This makes it possible to protect the LSI from an abnormal branch of a program caused by laser irradiation.

[8]<Protection of Condition Code Register in CPU>

In item 1, the logic circuit is a processor (20), and the n storage elements include a register (25) for providing a condition to which the processor refers at the time of executing a conditional branch instruction.

This makes it possible to protect the LSI from an abnormal branch of a program caused by laser irradiation.

[9]<Protection of General-Purpose Register in CPU>

In item 1, the logic circuit is a processor (20), and the n storage elements include a general-purpose register (26) of the processor.

This makes it possible to protect the LSI from abnormal arithmetic operation processing of a program caused by laser irradiation.

[10]<Reset upon Detecting Attack>

In item 1, the logic circuit is a processor (20), and an output of the attack detection circuit is inputted to a reset terminal of the processor.

With this, when an attack by laser irradiation is detected, the processor is reset, which can protect confidential information stored in the LSI.

[11]<Delete Confidential Information upon Detecting Attack>

In item 1, the logic circuit is a processor having a memory (30), the attack detection circuit can generate an interrupt to the processor, and the processor deletes information stored in the memory upon detecting the attack.

With this, when an attack by laser irradiation is detected, the confidential information stored in the memory is deleted, which can protect the confidential information stored in the LSI.

[12]<Shut Off Power Supply Upon Detecting Attack>

In item 1, the semiconductor integrated circuit further includes a power supply circuit having a power supply control terminal for controlling power supply to the logic circuit. An output of the attack detection circuit is coupled to the power supply control terminal of the power supply circuit, and the power supply to the logic circuit is shut off upon detecting the attack.

With this, when an attack by laser irradiation is detected, the power is shut off, which can protect the confidential information stored in the LSI.

[13]<Error Determination Circuit+Light Irradiation Detection Circuit>

A semiconductor integrated circuit (10) including a logic circuit (6) including n storage elements (5_1 to 5_6) (n is a positive integer) which can each store 1-bit information and an attack detection circuit (1) is configured as follows.

The attack detection circuit includes an error determination circuit (2) and a light irradiation detection circuit (4) having light detection elements.

The error determination circuit can detect through a logic operation that k-bit or less errors (k is a positive integer) have occurred in n-bit codes stored in the n storage elements.

A plurality of areas surrounding arbitrary (k+1) storage elements of the n storage elements, with a minimum closed curve having no inward convex circumference, each contain at least one light detection element, and the light irradiation detection circuit detects light irradiation to (k+1) or more of the n storage elements at the time of detecting that light has been irradiated to at least one of the light detection elements.

It is determined that the logic circuit has been attacked from outside when the error determination circuit detects an error or the light irradiation detection circuit detects light irradiation.

This makes it possible to detect a laser attack, irrespective of the number of error bits in multi-bit storage elements caused by the laser attack on the logic circuit.

2. Details of Embodiments

Embodiments will be described in greater detail below.

First Embodiment

Error Determination Circuit+Light Irradiation Detection Circuit

A laser attack can cause a malfunction of any component in an entire circuit irradiated with laser light. However, the provision of malfunction detection circuits for an entire logic circuit greatly increases the circuit size, and is therefore mostly not allowed in terms of cost. For this reason, only storage elements such as flip-flops and latches are protected. Values stored in storage elements such as flip-flops and latches are inverted by laser irradiation at arbitrary timing, which enables an attacking side to easily cause a malfunction. On the other hand, in general logic gates as well, a logical value is inverted by laser irradiation at arbitrary timing; however, a value inverted outside the range of timing of data acquisition by a storage element is restored without affecting a circuit operation, which is not an effective attack for the attacking side.

For this reason, malfunctions of only storage elements such as flip-flops and latches are detected and protected, thereby making it possible to efficiently protect the entire logic circuit without greatly increasing the circuit size.

FIG. 1 is an explanatory diagram showing a configuration example of a semiconductor device according to the first embodiment. The semiconductor integrated circuit 10 has a logic circuit 6 including n flip-flops 51 to 56 (n is a positive integer) and an attack detection circuit 1, and is configured as follows. The attack detection circuit 1 includes an error determination circuit 2 and a light irradiation detection circuit 4 having light detection elements.

The error determination circuit 2 can detect through a logic operation that k-bit or less errors (k is a positive integer) have occurred in n-bit data stored in the n flip-flops. For example, m redundant bits are added to (n-m)-bit data to form k-bit error detection codes, which can configure an error detection circuit, i.e., the error determination circuit 2. A known error detection circuit based on a code theory such as a parity code, a cyclic redundancy code, a BCH code can be used. Further, for example, the same value is stored in two flip-flops, and the two values are read and compared. If they do not match, an error determination is made. This can also configure the error determination circuit 2. The comparison of the two flip-flops is 1-bit error detection. In the case of 2-bit errors, both the two flip-flops are inverted, therefore, it is not possible to detect them.

In the case where the error determination circuit 2 is configured with an error detection circuit capable of detecting k-bit or less errors, the light irradiation detection circuit is configured to detect that (k+1) flip-flops are simultaneously irradiated with light. Consideration will be given to an area surrounding arbitrary (k+1) flip-flops included in the n flip-flops 5. This area is configured with a minimum closed curve having no inward convex circumference. In the case where this area is a circle, the smallest circle surrounding all flip-flops is specified as this area. A circle in which a laser beam from the attacking side is focused is the smallest area for simultaneously irradiating light to all (k+1) flip-flops. The shape in which the laser beam is focused is not limited to the circle, and an ellipse or the like should be taken into consideration; however, due to the light focusing, the shape would be limited to an area surrounded by an outward-convex closed curve. At least one light detection element 3 is disposed within this area. With this, it is detected that the entire area is irradiated with light, that is, all the (k+1) flip-flops are irradiated with light.

In the example of FIG. 1, the error determination circuit 2 can detect 2-bit errors in the six flip-flops 5_1 to 5_6, and one light detection element 3 is necessarily disposed for arbitrary three of the six flip-flops 5. A light detection element 3_1 is disposed in the center of a circle 51 surrounding three flip-flops 5_1, 5_2, and 5_3. A light detection element 3_2 is disposed in the center of a circle 52 surrounding three flip-flops 5_2, 5_4, and 5_5. A light detection element 3_3 is disposed in the center of a circle 53 surrounding three flip-flops 5_2, 5_3, and 5_5. A light detection element 3_4 is disposed in the center of a circle 54 surrounding three flip-flops 5_3, 5_5, and 5_6. The combination of any other three flip-flops is included in an area larger than the illustrated circles 51 to 54; therefore, one or more light detection elements 3 are necessarily disposed in the area. In the case where laser light is focused in a circle, it is possible to detect light irradiation to arbitrary three or more flip-flops among the six flip-flops 5_1 to 5_6 which the error determination circuit 2 checks. The circles 51 to 54 are the minimum area for detecting light irradiation. It cannot be guaranteed that the light irradiation detection circuit 4 according to this embodiment can necessarily detect irradiation with light focused in an area smaller therethan.

When the error determination circuit 2 detects an error or the light irradiation detection circuit 4 detects light irradiation, it is determined that the logic circuit has been attacked from outside. Laser light irradiation to (k+1) or more flip-flops 5 is detected by the light irradiation detection circuit 4, and errors that occur in k or less flip-flops 5 irradiated with focused laser light are detected by the error determination circuit 2.

This makes it possible to detect a laser attack, irrespective of the number of error bits in multi-bit storage elements caused by the laser attack on the logic circuit. The error determination circuit 2 detects k-bit or less errors, and the light irradiation detection circuit 4 detects (k+1)-bit or more errors, which are complementary to each other; accordingly, it is possible to detect errors of any number of bits.

The flip-flop can be replaced with a latch, a memory cell, or other storage elements that can store 1-bit information.

While FIG. 1 shows the example in which laser light is focused in a circle; with the same concept applied to laser light focused in an ellipse or the like, light detection elements can be disposed to configure the light irradiation detection circuit 4.

Since this embodiment is characterized by the arrangement of light detection elements, particularly the relative position relationship with flip-flops (storage elements); a known light irradiation detection circuit can be adopted as the light irradiation detection circuit 4.

Figure 13:
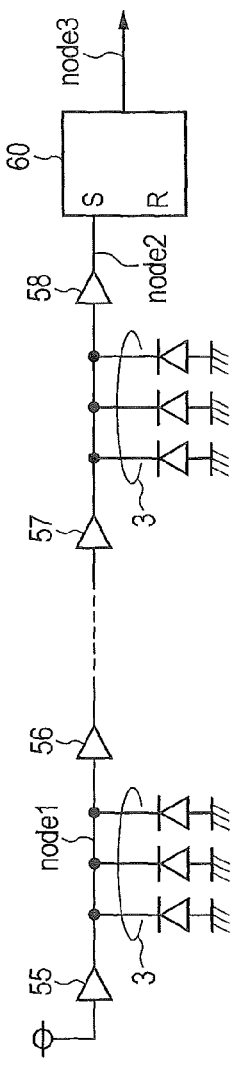
FIG. 13 is a circuit diagram showing the configuration of a light irradiation detection circuit using photodiodes as light detection elements.
Figure 14:
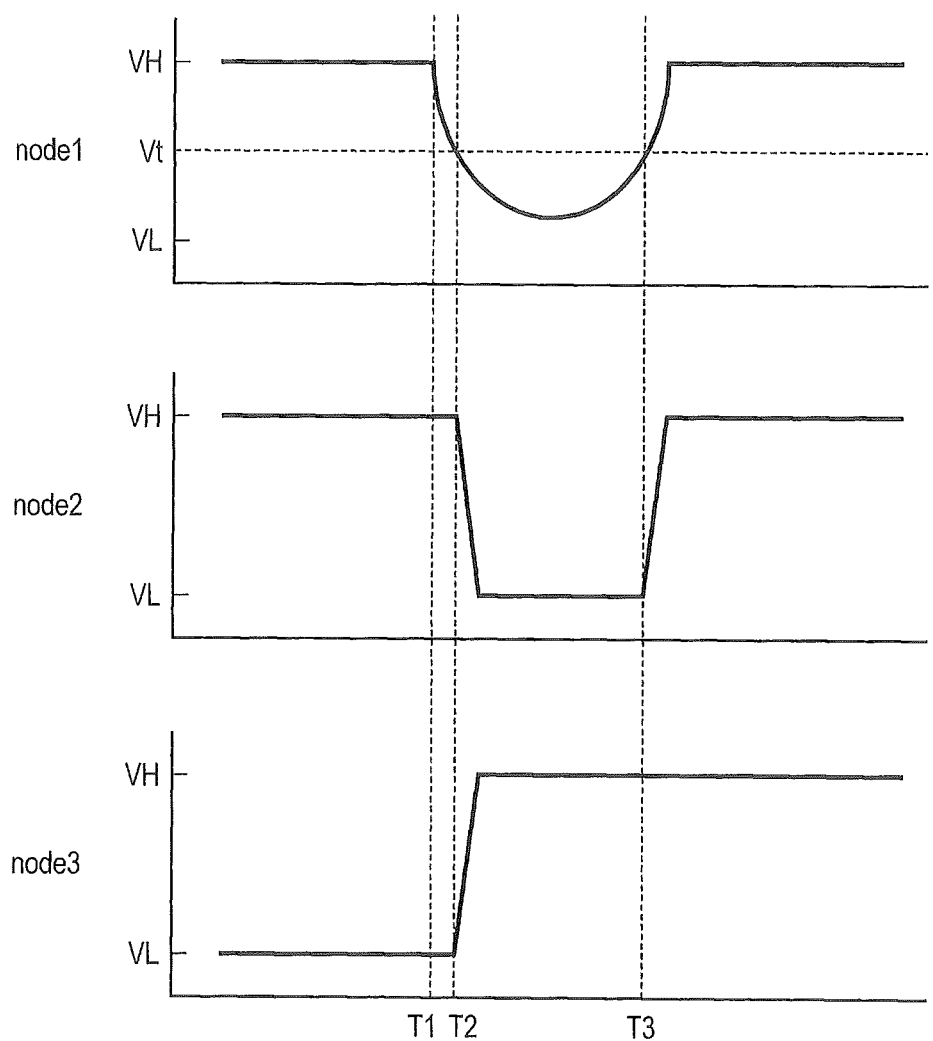
FIG. 14 is a timing chart showing the operation of the light irradiation detection circuit using photodiodes as light detection elements.

FIG. 13 is a circuit diagram showing the configuration of the light irradiation detection circuit using photodiodes as light detection elements. FIG. 14 is a timing chart showing the operation thereof. A plurality of photodiodes are coupled in parallel to a node 1. The node 1 is driven to a high level by a buffer 55. A plurality of photodiodes driven by other buffers may be cascade-coupled. A voltage is wave-shaped by a buffer 58 (node 2), inputted to an SR latch 60, and outputted to a node 3 which is a light irradiation detection output. Since the node 1 is driven to the high level by the buffer 55 and the photodiodes 3 are reverse-biased, the node 1 is normally maintained at the high level. For example, when light is irradiated to a photodiode 3 between the buffers 55 and 56, electron-hole pairs generated in the photodiode 3 by the irradiated light produce a reverse current, so that a potential at the node 1 decreases. When the potential becomes less than a logic threshold Vt of the buffer 56, it propagates as a pulse waveform to subsequent stages including the node 2. The SR latch 60 is reset by this pulse, which inverts the node 3 to the high level and maintains it. By appropriately setting the drive capability of the buffer 55, the potential at the node 1 can become less than the logic threshold Vt of the buffer 56 in design when light is irradiated to one of the parallel-coupled photodiodes 3. With this, it is possible to configure the light irradiation detection circuit for detecting light irradiation to one of the photodiodes. The photodiodes may be replaced with phototransistors or the like as light detection elements.

Figure 15A:
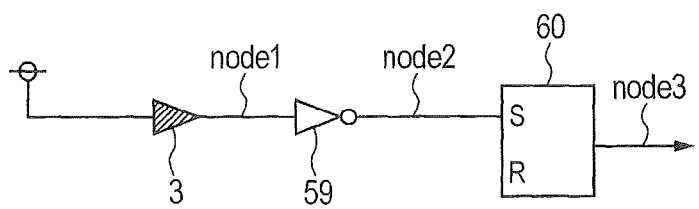
FIGS. 15A and 15B are circuit diagrams showing the configuration of a light irradiation detection circuit using photo-response-type buffers as light detection elements.
Figure 15B:
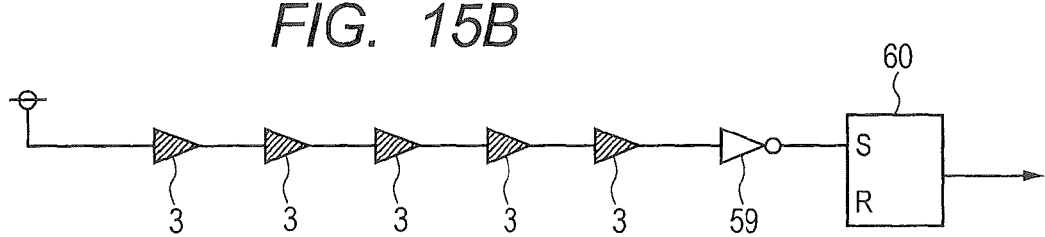
Figure 16:
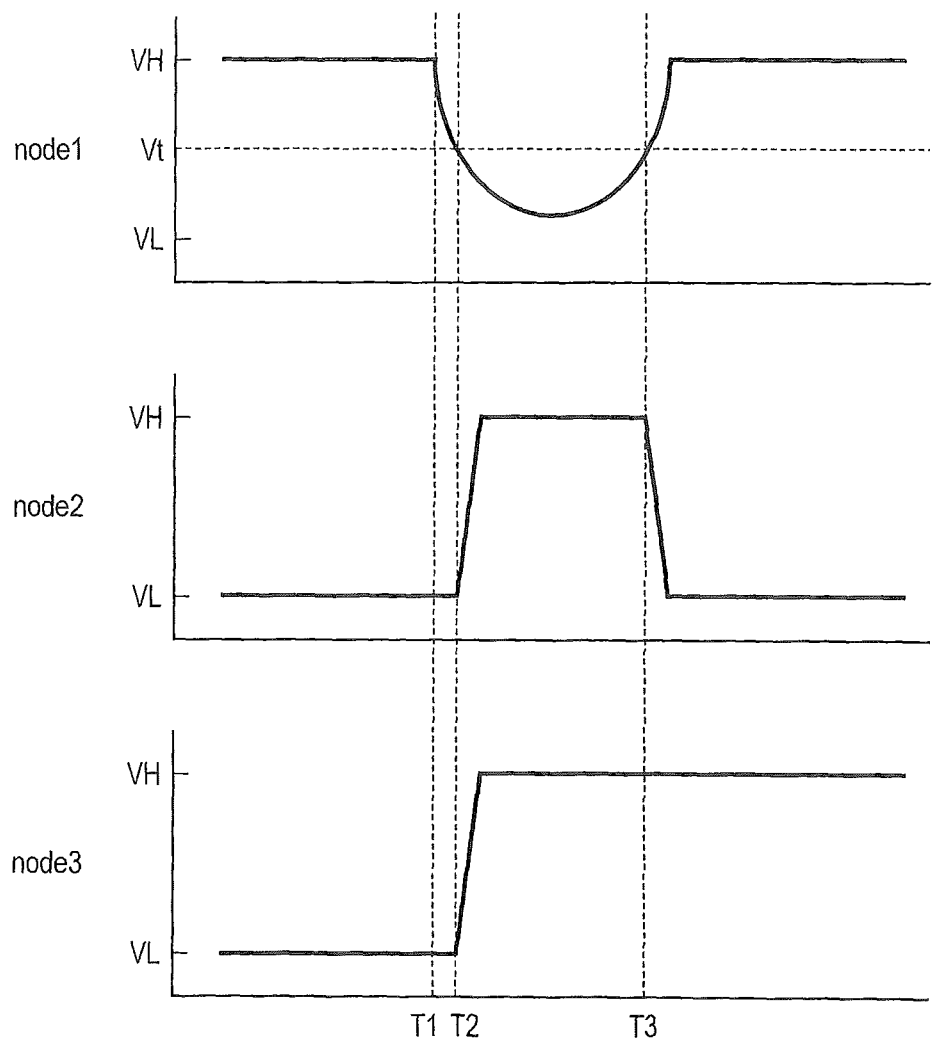
FIG. 16 is a timing chart showing the operation of the light irradiation detection circuit using photoresponse-type buffers as light detection elements.

FIGS. 15A and 15B are circuit diagrams showing the configuration of the light irradiation detection circuit using photoresponse-type buffers as light detection elements. FIG. 16 is a timing chart showing the operation thereof. In normal logic gates, malfunctions might be caused by light irradiation. Originally, the fault attack by laser irradiation on an LSI utilizes this principle. A buffer in which a metal wiring layer is not disposed over an upper layer of a cell in layout malfunctions by light irradiation more easily than a normal buffer. Such a buffer can be used as a photoresponse-type buffer. In the light irradiation detection circuit shown in FIG. 15A, the output of the photoresponse-type buffer 3 whose input is fixed to the high level is inputted through an inverter 59 to the SR latch 60. As shown in FIG. 15B, a plurality of photoresponse-type buffers 3 may be cascade-coupled. When light is irradiated to at least one photoresponse-type buffer 3, a potential at a node 1 which is an output node thereof decreases. If the potential at the node 1 decreases and becomes less than the logic threshold Vt of the subsequent inverter 59 even though it is not completely inverted, a pulse appears at a node 2 which is the output of the inverter 59. The SR latch 60 acquires this pulse, and outputs it to a node 3 which is a light irradiation detection output. With this, it is possible to configure the light irradiation detection circuit 4 for detecting light irradiation to one of the photoresponse-type buffers. The photoresponse-type buffers may be replaced with photoresponse-type inverters or other logic gate circuits as light detection elements.

Second Embodiment

Figure 2:
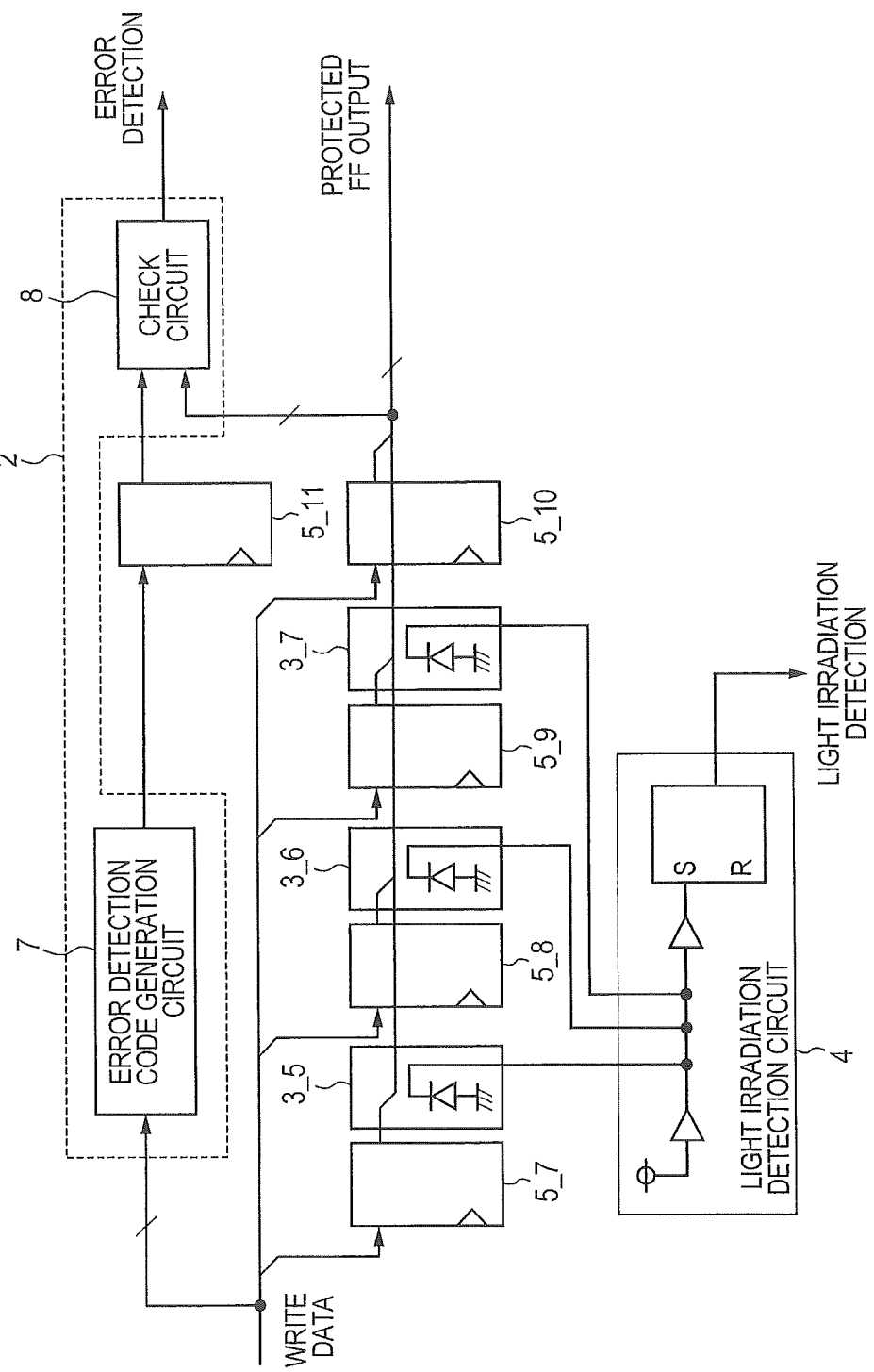
FIG. 2 is an explanatory diagram showing a specific configuration example of a semiconductor device according to a second embodiment.

Generation and Check of 1-Bit Error Detection Code+Light Irradiation Detection Circuit FIG. 2 is an explanatory diagram showing a specific configuration example of a semiconductor device according to the second embodiment. In the configuration example, the error determination circuit 2 can detect a 1-bit error, and light detection elements 3_5 to 3_7 are interleaved between storage elements 5_7 to 5_10 so as to detect laser light irradiation to 2-bit or more storage elements.

The semiconductor device includes an error detection code generation circuit 7 for generating an error detection code based on write data stored in the flip-flops 5_7 to 5_10. The error detection code generated by the error detection code generation circuit 7 is stored in a flip-flop 5_11. A check circuit 8 determines the presence or absence of an error based on data read from the flip-flops 5_7 to 5_10 and the error detection code stored in the flip-flop 5_11, and outputs an error detection signal in the presence of the error. The outputs of the light detection elements 3_5 to 3_7 are coupled to the light irradiation detection circuit 4 which outputs a light irradiation detection signal upon detecting light irradiation to at least one of the light detection elements 3_5 to 3_7.

The error detection code is, for example, a parity code. The error detection code generation circuit 7 generates data 0 as even parity if the number of is in write data is even or generates data 1 as odd parity if the number of 1s is odd, and stores it in the flip-flop 5_11. The check circuit 8 is a parity check circuit. The check circuit 8 determines whether the number of is in data read from the flip-flops 5_7 to 5_10 is even or odd, and compares it with data stored in the flip-flop 5_11. One-bit inversion in the data read from the flip-flops 5_7 to 5_10 causes a parity change, which can be detected by the parity check circuit 8. On the other hand, the check circuit 8 cannot detect 2-bit or more data inversion.

Since the light detection elements 3_5 to 3_7 are disposed alternately with the flip-flops 5_7 to 5_10, light irradiation to two or more flip-flops can necessarily be detected by at least one of the light detection elements 3_5 to 3_7.

With this, when a malfunction occurs in only a 1-bit flip-flop by an attack with focused laser light, the error determination circuit can detect it. Further, when malfunctions occur in two or more flip-flops by an attack with a larger diameter of laser light, the light irradiation detection circuit 4 can detect light irradiation.

Figure 3:
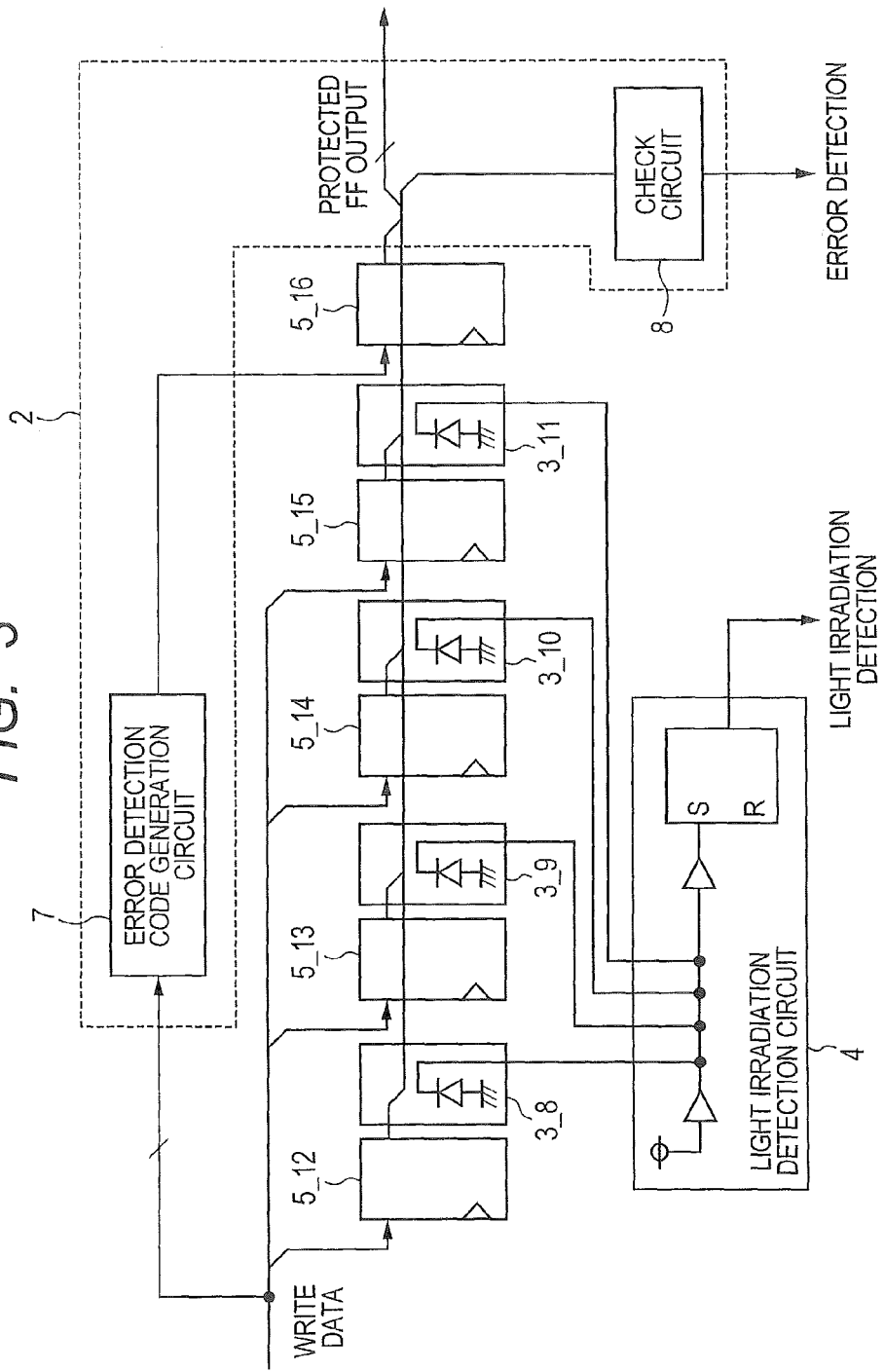
FIG. 3 is an explanatory diagram showing a configuration example for further protecting, as the detection of light irradiation, a storage element for storing an error detection code in the semiconductor device according to the second embodiment.

FIG. 3 is an explanatory diagram showing a configuration example for further protecting, as the detection of light irradiation, a storage element for storing an error detection code in the semiconductor device according to the second embodiment.

In the configuration example, light detection elements 3_8 to 3_11 are interleaved between five flip-flops including flip-flops 5_12 to 5_15 which are storage elements for storing protected data and a flip-flop 5_16 which is a storage element for storing an error detection code.

A circuit configuration for determining an error including the configuration of the error detection code generation circuit 7 and the check circuit 8 is the same as that shown in FIG. 2. The light detection element 3_11 is disposed between the flip-flops 5_12 to 5_15 and the flip-flop 5_16 for storing the error detection code, and also coupled to the light irradiation detection circuit 4. It is possible to detect light irradiation to two flip-flops including the flip-flop 5_16 for storing the error detection code.

This makes it possible to protect against a laser attack on the protected circuits including the parity check circuit for checking the storage elements for storing n-bit information including the generated parity code for the protected (n−1) bits. The parity code generation circuit and the parity check circuit can be configured with simple logic gates, which can suppress the overhead of circuits for protection.

Third Embodiment

Generation and Check of m-Bit Error Detection Code+Light Irradiation Detection Circuit While the second embodiment utilizes the 1-bit error detection code, the error detection capability can be arbitrarily enhanced. In the case where the error detection capability of the error determination circuit 2 is enhanced, the light irradiation detection capability of the light irradiation detection circuit 4 can be reduced. In the case where the error determination circuit 2 can detect m-bit or less errors, it is only necessary for the light irradiation detection circuit 4 to have the capability of detecting light irradiation to (m+1) or more storage elements. More specifically, one light detection element is arranged for m storage elements.

Figure 4:
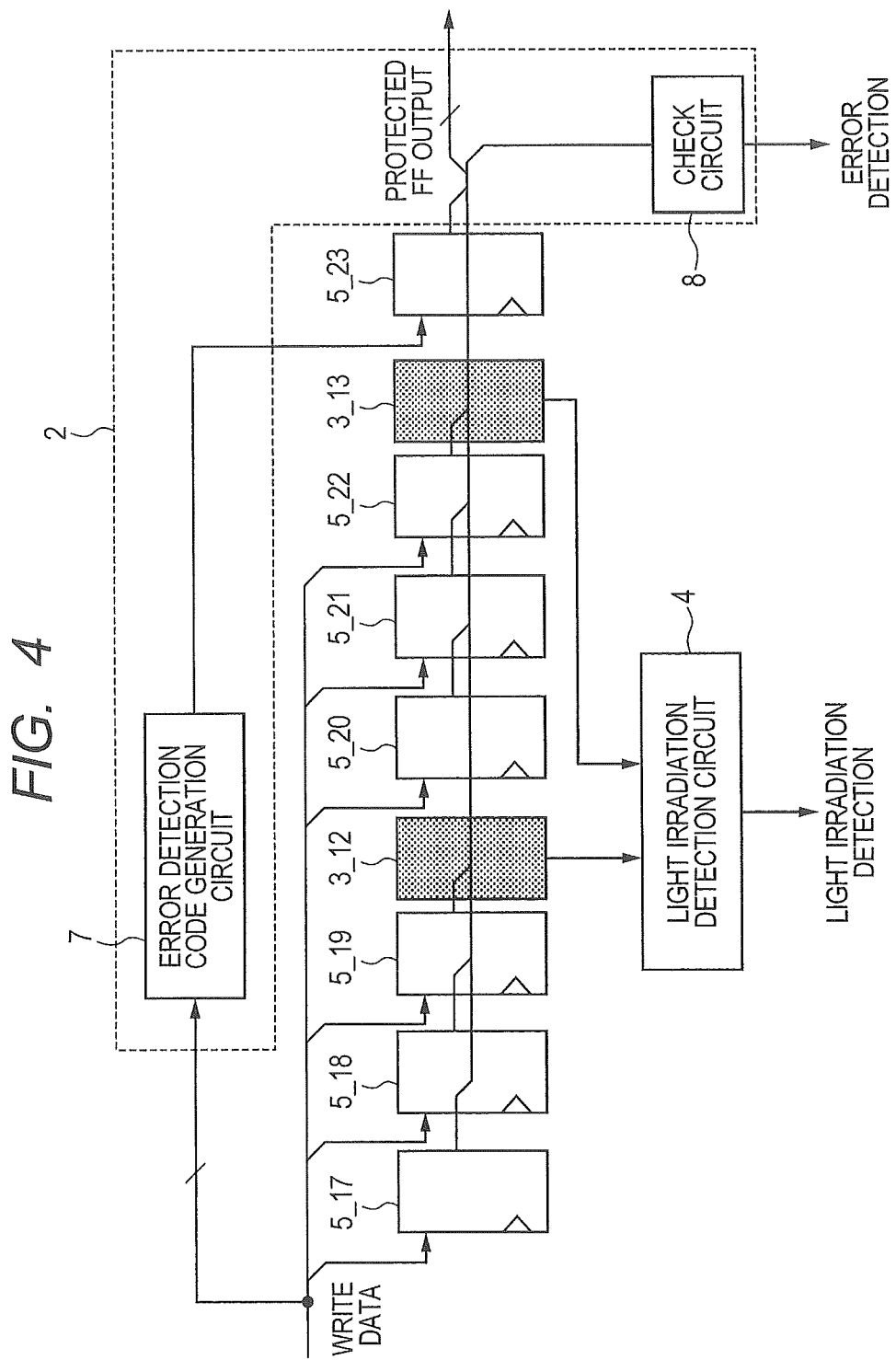
FIG. 4 is an explanatory diagram showing a configuration example in which a semiconductor device according to the third embodiment utilizes a 3-bit error detection code.

FIG. 4 is an explanatory diagram showing a configuration example in which a semiconductor device according to the third embodiment utilizes a 3-bit error detection code.

The semiconductor device includes the error detection code generation circuit 7 for generating an error detection code based on write data stored in flip-flops 5_17 to 5_22. The error detection code generated by the error detection code generation circuit 7 is stored in a flip-flop 5_23. The error detection code is not necessarily composed of 1 bit, and generally composed of multiple bits. The check circuit 8 determines the presence or absence of an error based on data read from the flip-flops 5_17 to 5_22 and the error detection code stored in the flip-flop 5_23, and outputs an error detection signal in the presence of the error. Light detection elements 3_12 to 3_13 are each arranged for three of the flip-flops 5_17 to 5_23. The specific arrangement, that is, the position relationship among storage elements and light detection elements is detailed in the first embodiment and FIG. 1, and will be described in a fifth embodiment and FIG. 7. The outputs of the light detection elements 3_12 to 3_13 are coupled to the light irradiation detection circuit 4 which outputs a light irradiation detection signal upon detecting light irradiation to at least one of the light detection elements 3_12 to 3_13.

As for the error detection code, a known error detection circuit based on a code theory such as a cyclic code, a BCH code, etc. can be used. Since the light detection elements 3_12 to 3_13 are each arranged for three of the flip-flops 5_17 to 5_23, the light detection elements 3_12 to 3_13 can necessarily detect light irradiation to four or more of the flip-flops 5_17 to 5_23. When malfunctions occur in only m-bit or less flip-flops by an attack with focused laser light, the error determination circuit can detect them. Further, when malfunctions occur in (m+1) or more flip-flops by an attack with a larger diameter of laser light, the light irradiation detection circuit 4 can detect light irradiation.

This makes it possible to protect against a laser attack on the storage elements for storing n-bit information including the generated m-bit error detection codes for the protected (n-m) bits.

Fourth Embodiment

Circuit Duplexing+Light Irradiation Detection Circuit

Figure 5:
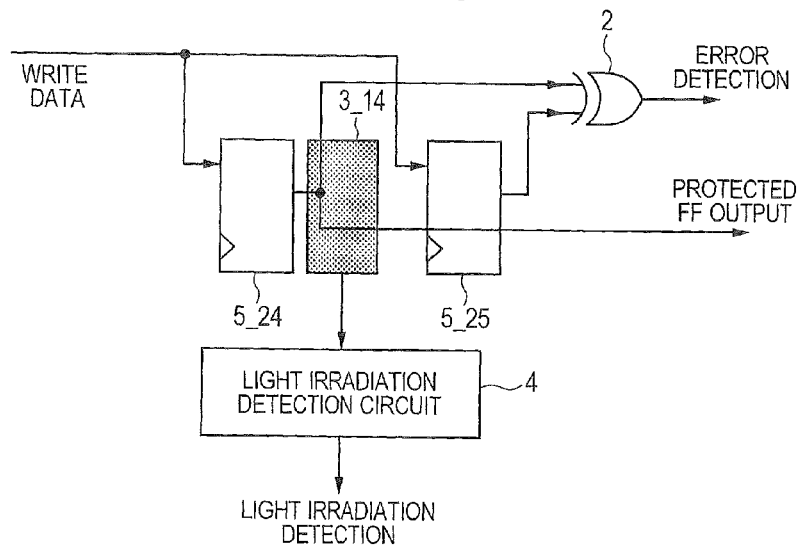
FIG. 5 is an explanatory diagram showing a configuration example for utilizing protection by the duplexing of a semiconductor device according to the fourth embodiment.

FIG. 5 is an explanatory diagram showing a configuration example for utilizing protection by the duplexing of a semiconductor device according to the fourth embodiment.

Write data is written to a flip-flop 5_24 which is an active system and a flip-flop 5_25 which is a backup system, and data stored in the flip-flop 5_24 which is the active system is read as protected FF output. The error detection circuit 2 is an exclusive-OR gate, and outputs an error detection signal if data read from the flip-flop 5_24 and data read from the flip-flop 5_25 do not match.

A light detection element 3_14 is disposed between the flip-flop 5_24 which is the active system and the flip-flop 5_25 which is the backup system. Based on the output thereof, the light irradiation detection circuit 4 outputs a light irradiation detection signal.

When light is irradiated to one of the flip-flops 5_24 and 5_25 which are the active and backup systems so that data is inverted, the attack is detected as an error detection signal. When light is irradiated to both of the flip-flops 5_24 and 5_25, the attack is detected as a light detection signal.

While FIG. 5 shows the duplexed circuit of the active and backup systems configured with only two flip-flops to facilitate understanding, it is possible to perform enhancement to multiple bits and the multiplexing of logic circuits etc.

Active flip-flops of multiple bits are provided with backup flip-flops of the same number of bits. The error determination circuit 2 compares the two systems, and outputs the error detection signal if they do not match. Each light detection element is disposed between the corresponding bits of the active and backup flip-flops and inputted to the light irradiation detection circuit 4 which outputs the light irradiation detection signal upon detecting light irradiation to any one of the light detection elements. Light irradiation that causes data inversion simultaneously in the active and backup systems can be detected by the light irradiation detection circuit 4, and data inversion that occurs in only one of them or an unsupported flip-flop can be detected by the error determination circuit 2. The same is applicable to the case of duplexing the entire circuit as well as the flip-flops as storage elements.

This makes it possible to protect against a laser attack that causes errors simultaneously in the active system and the corresponding backup system in the circuit adopting duplexing protection.

Fifth Embodiment

Arrangement of Light Detection Element

Figures 6A, 6B:
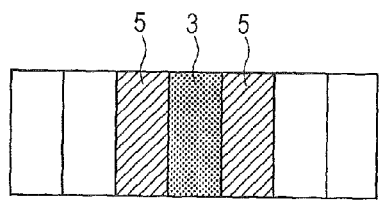
FIGS. 6A and 6B are explanatory diagrams showing the arrangement of flip-flops and light detection elements for detecting light irradiation to two or more storage elements (flip-flops).

FIGS. 6A and 6B are explanatory diagrams showing the arrangement of flip-flops and light detection elements for detecting light irradiation to two or more storage elements (flip-flops). Under the assumption of a design method for disposing and wiring standard cells in a cell row, FIGS. 6A and 6B show layouts in which standard cells are disposed in a cell row.

In FIG. 6A, one light detection element 3 is adjacently disposed between two flip-flops 5. When light is irradiated to the two flip-flops 5, the light is necessarily irradiated to the light detection element 3 therebetween; therefore, it is possible to detect light irradiation to two or more flip-flops. The flip-flops 5 and the light detection element 3 do not necessarily need to be adjacently disposed, and other logic gates may be disposed therebetween, as shown in FIG. 6B.

On the other hand, many design tools for disposing and wiring standard cells in the cell row do not have a method for easily specifying the arrangement of cells. In this case, by preparing new cells in which one light detection element 3 is adjacently disposed between two flip-flops 5, it is possible to easily achieve the arrangement relationship between the flip-flops and the light detection elements in the second to fourth embodiments, even with a design tool that does not have a method for specifying the arrangement of cells.

This makes it possible to detect simultaneous light irradiation to two or more of the n storage elements.

FIG. 7 is an explanatory diagram showing the arrangement of flip-flops and light detection elements for detecting light irradiation to four or more storage elements (flip-flops). One light detection element 3 is adjacently disposed between the two groups of three flip-flops 5. With this, the light detection element 3 can necessarily detect light irradiation to four or more of the six flip-flops. While the flip-flops 5 and the light detection element 3 are adjacently disposed in FIG. 7, logic gates or the like may be disposed therebetween as shown in FIG. 6B. On the other hand, by using new cells prepared by adjacently disposing the flip-flops and the light detection element, it is possible to easily achieve the arrangement relationship between the flip-flops and the light detection element in the fourth embodiment, even with a design tool that does not have a method for specifying the arrangement of cells.

This makes it possible to detect simultaneous light irradiation to four or more of the n storage elements.

Figure 8:
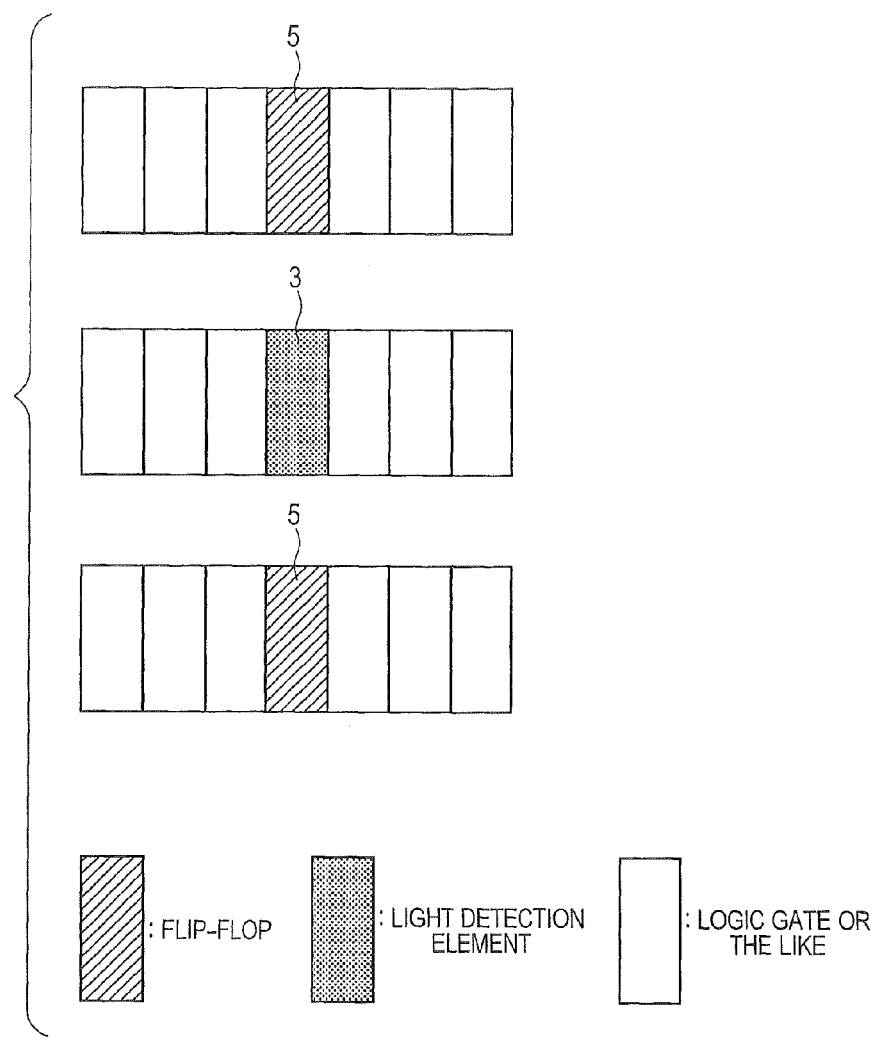
FIG. 8 is an explanatory diagram showing a modification for disposing flip-flops and light detection elements across a plurality of cell rows to detect light irradiation to two or more storage elements (flip-flops).

FIG. 8 is an explanatory diagram showing a modification for disposing flip-flops and light detection elements across a plurality of cell rows to detect light irradiation to two or more storage elements (flip-flops). While FIGS. 6A and 6B show examples in which the two flip-flops 5 and the light detection element 3 are disposed in one cell row, the light detection element 3 can be disposed between two flip-flops 5 across a plurality of cell rows. The same concept is applicable to the case where one light detection element is disposed between groups of a plurality of flip-flops as shown in FIG. 7.

Figure 9:
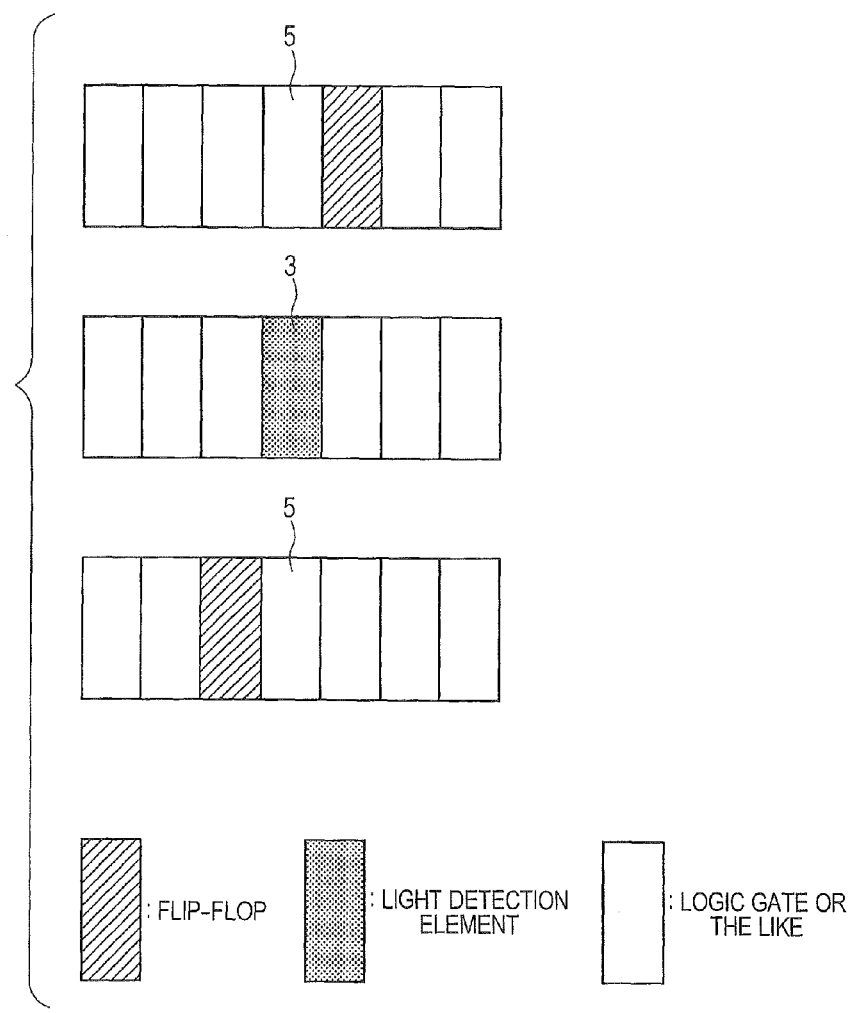
FIG. 9 is an explanatory diagram showing a modification for diagonally disposing flip-flops and light detection elements across a plurality of cell rows to detect light irradiation to two or more storage elements (flip-flops).

FIG. 9 is an explanatory diagram showing a modification for diagonally disposing flip-flops and light detection elements across a plurality of cell rows to detect light irradiation to two or more storage elements (flip-flops). Not only in the case of arranging the flip-flops and the light detection element orthogonally to the cell rows as shown in FIG. 8, but also in the case of diagonally disposing the light detection element 3 on a straight line joining two flip-flops, the same operation and effect can be obtained. Further, even in the case of a plurality of flip-flops and even in the case where other logic gates are provided therebetween, the same operation and effect can also be obtained as long as the light detection element 3 is disposed on a straight line joining two flip-flops.

FIG. 10 is an explanatory diagram showing a case where flip-flops and light detection elements are alternately adjacently disposed to detect light irradiation to two or more storage elements (flip-flops).

This makes it possible to design the layout of the LSI without particularly considering the arrangement of cells in automatic layout by preparing and using macro cells that satisfy the condition for detecting simultaneous light irradiation to two or more of the n storage elements.

Sixth Embodiment

Protection of CPU

Although normal operation checking by software is effective as measures against malfunctions, it is difficult to check by software the malfunction of a processor itself such as CPU.

To cause the processor such as CPU to malfunction, a fault attack for changing values of a general-purpose register, a program counter (PC), and a condition code register (CCR) for storing branch conditions is effective. On the other hand, by protecting them by hardware, the operation of the processor and software executed thereby can have enhanced resistance to the fault attack.

Figure 11:
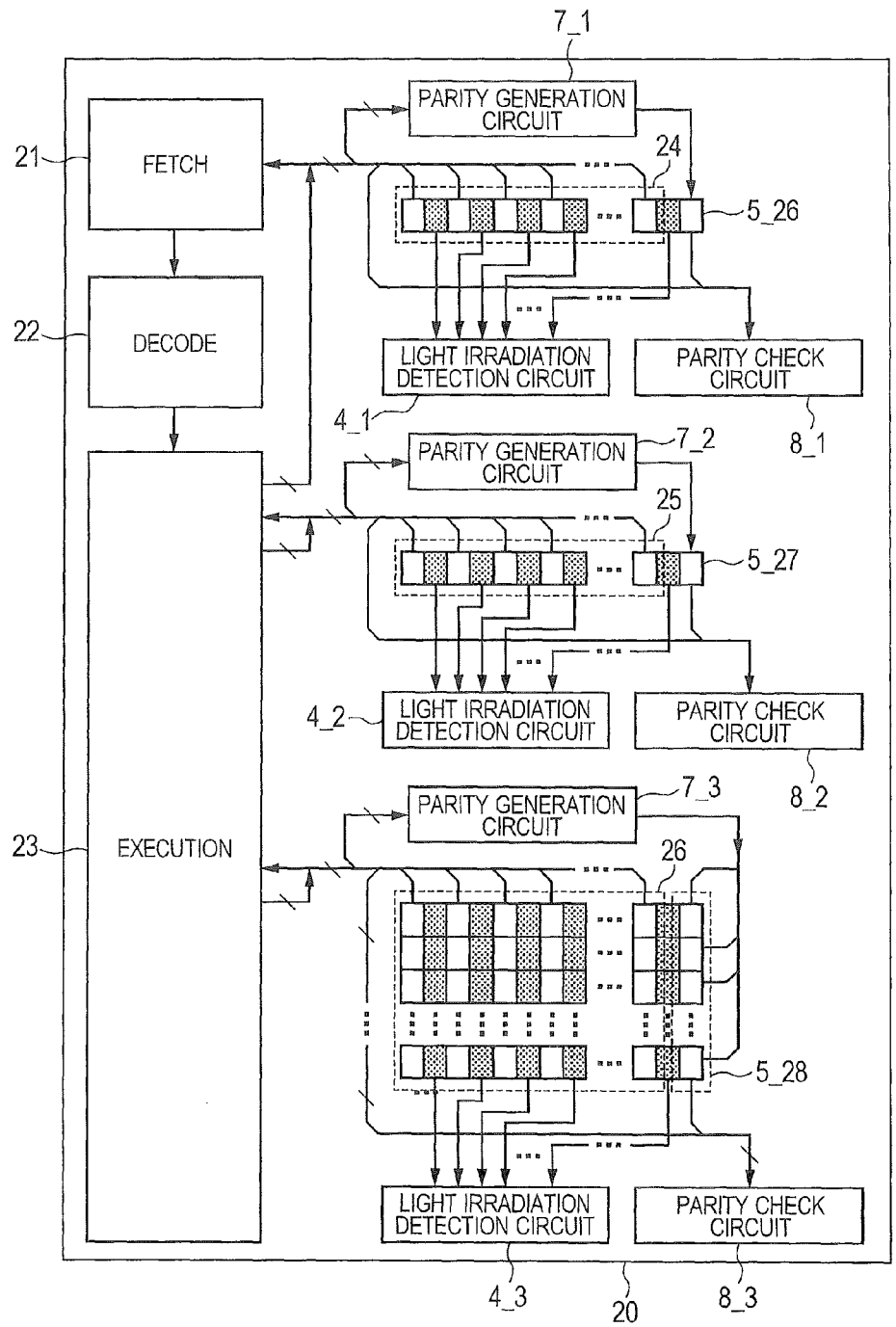
FIG. 11 is an explanatory diagram showing an embodiment for protecting a processor.

FIG. 11 is an explanatory diagram showing an embodiment for protecting the processor.

The processor such as CPU includes a fetch unit 21, a decode unit 22, and an instruction execution unit 23. The fetch unit 21 fetches an instruction stored in an address specified by a program counter 24, the decode unit 22 decodes the instruction, and the instruction execution unit 23 executes it. Arithmetic operation processing by the instruction execution unit 23 is performed through input/output with a general-purpose register 26. A state flag of an arithmetic operation result is stored in a condition code register 25. The instruction execution unit 23 performs a branch and arithmetic operation processing based on the state flag stored in the condition code register 25.

In this embodiment, the program counter 24, the condition code register 25, and the general-purpose register 26 respectively have parity generation circuits 7_1, 7_2, and 7_3, store generated parity in storage elements 5_26, 5_27, and 5_28, and have parity check circuits 8_1, 8_2, and 8_3 to detect errors. Each light detection element 3 is disposed between one bit and the next one of storage elements configuring the program counter 24, the condition code register 25, and the general-purpose register 26. Light irradiation detection circuits 41, 4_2, and 43 detect light irradiation. The numbers of general-purpose registers, parity generation circuits 7_3 for the general-purpose registers 26, storage elements 5_28 for storing generated parity, parity check circuits 8_3 are the same.

A 1-bit error which has occurred in any one of the program counter 24, the condition code register 25, and the general-purpose register 26 can be detected by the parity check circuits 8_1 to 8_3. Light irradiation to two or more storage elements which causes 2-bit or more errors can be detected by the light irradiation detection circuits 4_1 to 4_3.

By protecting one or both of the program counter 24 and the condition code register 25, it is possible to protect the LSI from an abnormal branch of a program caused by laser irradiation. Further, by protecting the general-purpose register 26, it is possible to protect the LSI from abnormal arithmetic operation processing of a program caused by laser irradiation.

In the example shown in FIG. 11, the parity check circuits 8_1 to 8_3 detect the 1-bit error, and the light irradiation detection circuits 4_1 to 4_3 detect the light irradiation to two or more storage elements, thereby protecting the CPU 20. Instead thereof, the combination of error detection circuits of arbitrary m bits not less than 2 bits and light irradiation detection circuits that can detect light irradiation to (m+1) storage elements may be used. Further, even in the case of protecting only one of the program counter 24, the condition code register 25, and the general-purpose register 26, the protection effect can be exerted. On the other hand, expansion of protection to all of the program counter 24, the condition code register 25, and the general-purpose register 26 and other storage elements enhances resistance to the attack.

Seventh Embodiment

Processing at Detection of Attack

If the error determination circuit 2 detects an error or the light irradiation detection circuit 4 detects light irradiation, it can be determined that a fault attack is being made. If it is determined that the fault attack is being made, various kinds of processing can be performed to protect stored confidential information.

Figure 12:
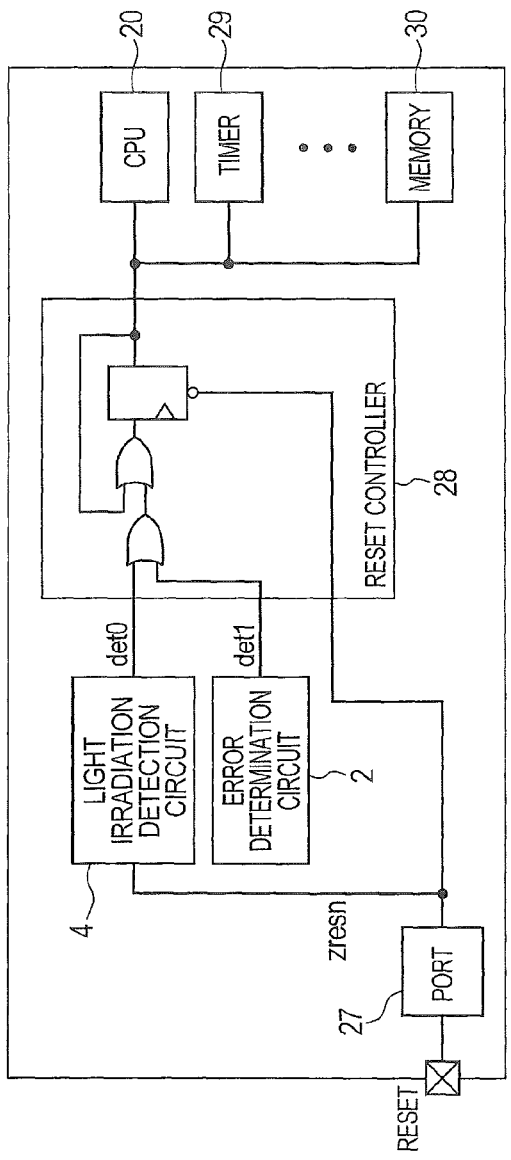
FIG. 12 is an explanatory diagram showing an embodiment for resetting the processor upon detecting an attack in the embodiment for protecting the processor.

FIG. 12 is an explanatory diagram showing an embodiment for resetting the processor upon detecting an attack in the embodiment for protecting the processor. A normal reset signal inputted from a reset terminal RESET is supplied through a reset controller 28 to the CPU 20 and a peripheral module such as a timer 29 or a memory 30. An error determination output det1 of the error determination circuit 2 and a light irradiation detection output det0 of the light irradiation detection circuit 4 are inputted to the reset controller 28. At the time of reception of the fault attack as well as the normal reset, the entire LSI including the CPU 20 is also reset.

With this, when an attack by laser irradiation is detected, the processor is reset, which can protect confidential information stored in the LSI.

It is possible to generate an interrupt to the CPU 20 instead of the reset upon detecting the fault attack and delete confidential information stored in the memory by software processing.

With this, when an attack by laser irradiation is detected, the confidential information stored in the memory is deleted, which can protect the confidential information stored in the LSI.

It is possible to provide a power supply circuit for supplying power to the CPU etc. in the LSI and shut off the power supply to the CPU etc. upon detecting the fault attack.

With this, when an attack by laser irradiation is detected, the power is shut off, which can protect the confidential information stored in the LSI.

These can be used independently or in a combined manner. In the case of necessity of relatively prompt protection, the reset and the power shut-off are effective. On the other hand, in the case where the LSI has time for processing, the deletion of the confidential information in the memory by the CPU is most reliable. When the CPU itself is attacked, it is difficult to perform processing by software such as the deletion of the confidential information in the memory by the CPU; therefore, the reset and the power shut-off are effective.

While the invention made above by the present inventors has been described specifically based on the illustrated embodiments, the present invention is not limited thereto. It is needless to say that various changes and modifications can be made thereto without departing from the spirit and scope of the invention.

What is claimed is:

1. A method of a semiconductor integrated circuit comprising a logic circuit including n storage elements (n is a positive integer) which can each store 1-bit information and an attack detection circuit, the method comprising:
    detecting, by an error determination circuit, through a logic operation that k-bit or less errors (k is a positive integer) have occurred in n-bit codes stored in the n storage elements;
    detecting, by a light irradiation detection circuit which includes light detection elements, that light has been irradiated to (k+1) or more of the n storage elements; and
    determining that the logic circuit has been attacked from outside when the error determination circuit detects an error or the light irradiation detection circuit detects light irradiation.

2. The method according to claim 1, further comprising:
    storing, by the n storage elements including m storage elements, m-bit error detection codes; and
    generating, by the error determination circuit including an error detection code generation circuit, an error detection code from (n-m) storage elements of the n storage elements and a check circuit which can detect occurrence of an error in the n storage elements.

3. The method according to claim 1, further comprising:
    storing, by the n storage elements including one storage element, a 1-bit parity code and the light irradiation detection circuit includes (n-1) light detection elements;
    generating, by the error determination circuit comprising a parity code generation circuit, the parity code from (n-1) storage elements of the n storage elements;
    detecting, by a parity check circuit, an occurrence of an error in the n storage elements; and
    detecting, by the light irradiation detection circuit, an occurrence of an error for detecting that light has been irradiated to two or more of the n storage elements at the time of detecting that light has been irradiated to at least one of the (n-1) light detection elements.

4. The method according to claim 3, wherein arbitrary two storage elements selected from the n storage elements are necessarily disposed with at least one light detection element interposed therebetween.

5. The method according to claim 4, wherein the (n-1) light detection elements and the n storage elements are each alternately adjacently disposed in a single cell row.

6. The method according to claim 1,
wherein the n storage elements comprise m active storage elements which are outputs of an active logic circuit and m backup storage elements which are outputs of a backup logic circuit duplexed with the active circuit;
further comprising:
    detecting, by the error determination circuit, that an error has occurred if an output of an active storage element does not match an output of a corresponding backup storage element, and
    wherein in the active storage elements and the corresponding backup storage elements, corresponding two storage elements are disposed with at least one light detection element interposed therebetween.

7. The method according to claim 1,
wherein the logic circuit comprises a processor, and
wherein the n storage elements comprises a program counter of the processor.

8. The method according to claim 1,
wherein the logic circuit comprises a processor, and
further comprising providing, by the n storage elements, by a register, a condition to which the processor refers at the time of executing a conditional branch instruction.

9. The method according to claim 1,
wherein the logic circuit comprises a processor, and
wherein the n storage elements comprise a general-purpose register of the processor.

10. The method according to claim 1,
wherein the logic circuit comprises a processor, and
further comprising inputting an output of the attack detection circuit to a reset terminal of the processor.

11. The method according to claim 1,
wherein the logic circuit comprises a processor including a memory,
further comprising:
    generating, by the attack detection circuit, an interrupt to the processor; and
    deleting, by the processor, information stored in the memory upon detecting the attack.

12. The method according to claim 1, further comprising controlling, by a power supply circuit including a power supply control terminal, power supply to the logic circuit,
    wherein an output of the attack detection circuit is coupled to the power supply control terminal of the power supply circuit; and
    shutting off, by the power supply to the logic circuit, upon detecting the attack.

13. A method of semiconductor integrated circuit comprising a logic circuit including n storage elements (n is a positive integer) which can each store 1-bit information and an attack detection circuit, the attack detection circuit comprising an error determination circuit and a light irradiation detection circuit having light detection elements, the method comprising:
    detecting, by the error determination circuit, through a logic operation that k-bit or less errors (k is a positive integer) have occurred in n-bit codes stored in the n storage elements,
    wherein a plurality of areas surrounding arbitrary (k+1) storage elements of the n storage elements, with a minimum closed curve having no inward convex circumference, each contain at least one light detection element, and the light irradiation detection circuit detects light irradiation to (k+1) or more of the n storage elements at the time of detecting that light has been irradiated to at least one of the light detection elements; and determining that the logic circuit has been attacked from outside when the error determination circuit detects an error or the light irradiation detection circuit detects light irradiation.

14. A method of an attack detection circuit, the method comprising:

detecting through a logic operation that k-bit or less errors (k is a positive integer) have occurred in n-bit codes stored in n storage elements (where n is a positive integer) which can each store 1-bit information;

detecting that light has been irradiated to (k+1) or more of the n storage elements; and determining that a logic circuit including the n storage elements has been attacked from outside when detecting an error or detecting light irradiation.

15. The method according to claim 14, further comprising:

storing, by the n storage elements including m storage elements, m-bit error detection codes;

generating an error detection code from (n-m) storage elements of the n storage elements and a check circuit; and detecting an occurrence of an error in the n storage elements.

16. The method according to claim 14, further comprising:

storing, by the n storage elements including one storage element, a 1-bit parity code, wherein the light irradiation detection circuit includes (n−1) light detection elements; and generating the parity code from (n−1) storage elements of the n storage elements;

detecting an occurrence of an error in the n storage elements; and detecting an occurrence of an error for detecting that light has been irradiated to two or more of the n storage elements at the time of detecting that light has been irradiated to at least one of the (n−1) light detection elements.

17. The method according to claim 16, wherein arbitrary two storage elements selected from the n storage elements are necessarily disposed with at least one light detection element interposed therebetween.

18. The method according to claim 14, wherein the n storage elements comprise m active storage elements which are outputs of an active logic circuit and m backup storage elements which are outputs of a backup logic circuit duplexed with the active circuit, further comprising:

detecting that an error has occurred if an output of an active storage element does not match an output of a corresponding backup storage element, and wherein in the active storage elements and the corresponding backup storage elements, corresponding two storage elements are disposed with at least one light detection element interposed therebetween.

19. The method according to claim 14, wherein the (n−1) light detection elements and the n storage elements are each alternately adjacently disposed in a single cell row.

20. The method according to claim 14, wherein the logic circuit comprises a processor, and further comprising providing, by the n storage elements, by a register, a condition to which the processor refers at the time of executing a conditional branch instruction.

* * * * *